Patented Apr. 3, 1923.

1,450,865

UNITED STATES PATENT OFFICE.

JOSEPH PELC, OF CICERO, ILLINOIS.

WATER-SOLUBLE PRODUCT AND PROCESS OF MAKING THE SAME.

No Drawing.   Application filed May 5, 1922. Serial No. 558,786.

*To all whom it may concern:*

Be it known that I, JOSEPH PELC, a citizen of the United States, residing at Cicero, in the county of Cook and State of Illinois, have invented certain new and useful Improvements in Water-Soluble Products and Processes of Making the Same, of which the following is a specification.

This invention relates to a process of making effervescent and non-effervescent tablets, lozenges, pills, candies, confections, powders, and similar products which are readily soluble in water and which, in this specification, I term "water soluble products". These products prepared according to my process may contain besides the vehicle which is hereinafter described, sugars of different kinds, saccharine mixtures and suspensions, such as honey and glucose, gums, resins, fruit, flavoring, and medicinal extracts, medicinal substances, coloring matters, dyes, perfumes, substances used for cleaning and washing purposes, such as borates, phosphates, and soluble soaps, chemicals for photographic purposes, and other substances which are soluble in water in their original condition and which are more desirable in water solutions than in solid form for the purposes for which they are to be applied. The active substances and preparations here described, I term "active principles".

The vehicle, with which the active principles are mixed, consists of an intimate mixture of any normal or hydrogen containing carbonate, i. e., any salt of carbonic acid or any salt of carbonic acid containing hydrogen with any solid acid, or any solid salt of any acid containing hydrogen or of any such mixtures of these so called effervescing salts which reacting in an ordinary chemical way, produce salts soluble in water.

The object of this process is to combine both parts of the vehicle mixed intimately with an active principle or a mixture of the active principles which are per sé soluble in water, in such a way that the vehicle and the active principle will form a product permanently stable in dry atmosphere, not decomposable by heat in any climate, but readily soluble in water with or without effervescence and giving to such a solution the properties of the active principles used in making such product.

To make this object clear, a few examples illustrating the principle of the process are hereinafter set forth.

With an excess of the vehicle and with a fruit extract as the active principle, I can prepare a stable product that can be kept indefinitely, if protected from moisture, but which can be dissolved in water to form a pleasant, effervescing fruit beverage. Unless an excess of the vehicle is used, the same fruit extract forms with the vehicle a product soluble in water but without effervescence.

Colors, dyes, and cleaning, washing, medicinal substances and the like can be similarly combined by the use of their aqueous saturated solutions or gummy or saccharine suspensions and similar preparations to form stable products which are, however, soluble in water forming coloring, dyeing, cleaning, washing and medicinal solutions and the like, as will be understood.

As to the physico-chemical theory involved in this process, consideration may be limited to the vehicle, both parts of which must be so selected that the resulting salt mixture is soluble in water.

Considering the case of a vehicle that dissolves in water with the evolution of carbon dioxid, in my experimental studies of the general reaction

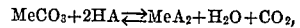
$$MeCO_3 + 2HA \rightleftarrows MeA_2 + H_2O + CO_2,$$

where Me=any metal, and HA=any monobasic acid, I have found that there are certain limiting conditions under which the right side action is either very slow or may be stopped entirely. These limiting conditions are concentration, temperature, pressure, and presence of water. This latter,— presence of water,—may be regarded as a branch of concentration, but for purposes of explanation, it is better to treat it separately, because water may act either as a catalytic agent, if present in small quantities, and as such, may be removed, or it may act as an ionic medium, if present in a considerable quantity. Dry salts of carbonic acid and dry acids, even dry hydrogen chlorid, will not react in an absolutely dry medium or solvent, such as benzene.

The older processes of making so called tablet triturates commonly involve making use of alcohol, which liquid is not employed in my process.

Solid dry mixtures of carbonates, with solid and dry acids, do not react at temperatures below 200–212° F., but do interact and evolve carbon dioxid at higher temperatures.

Now, I have found that I can regulate the general reaction resulting in the evolution of carbon dioxid at will by changing the amount of water present, the temperature, the pressure, and the concentration, so as to either evolve or not evolve carbon dioxid.

In my process, I am not concerned with pressures and temperature and concentration including the presence of water, may be limited to one only of these factors, so that it is possible to determine experimentally the conditions under which carbon dioxid will or will not be evolved. Considerations, therefore, will be limited to different degrees of temperature and to different quantities of water. It would be impractical to include in this specification a record of all the results I have obtained with different effervescing salts evolving different amounts of carbon dioxid at different temperatures and with different quantities of water present. Such results, however, have demonstrated clearly that if a system of certain effervescing salts is made to evolve carbon dioxid at a certain definite temperature and at a certain definite degree of concentration, it will be thereby to a certain degree, changed into another system, for which the temperature and concentration at which evolution of carbon dioxid occurs, are entirely different, and the evolution of gas will not occur at the temperature of the first system, if care is taken to isolate the new system completely, but only at a higher temperature, the concentration being constant.

To illustrate this, consider a system A, composed of $MeCO_3$, $2HA$, $H_2O$. In this system, I have $MeCO_3$ and $2HA$ in molecular proportions, and $H_2O$ only in quantity corresponding to about ten per cent of the total mass, or slightly more, but not enough to let the reaction proceed in the regular ionic way. In this system A, there will be a reaction, slow at room temperature but increasing in velocity as the temperature is raised, becoming rapid at 200–212° F., or over. If we keep system A at the latter temperature for a certain time and then cool it rapidly to room temperature, the evolution of the gas will stop and then there will be another system B, composed of $MeCO_3$, $2HA$, $MeA_2$, $H_2O$. Water is taken out of the reaction as water of crystallization, so there will really be present a mixture of $MeCO_3$, $2HA$, $MeA_2H_2O$, $MeCO_3H_2O$, $2HA$, $MeA_2$, and $MeCO_3H_2O$, $2HA$, $MeA_2H_2O$, composing system B. This system will not evolve carbon dioxid at temperatures up to 200–212° F., at which temperatures system A evolved carbon dioxid very rapidly. As a matter of fact, system B does not evolve carbon dioxid at temperatures closely approaching 200° F., if care is taken to isolate system B completely as (a) by not changing the degree of concentration by the removal of water of crystallization which occurs, if system B is kept too long at about 200–212° F., or (b) by cooling rapidly at low temperatures, or (c) by drying system B thoroughly by gradually increasing temperature so as not to disturb the composition, or (d) by keeping system B after drying it in a dry atmosphere, fully protected from moisture.

Another point to be considered is the velocity of the general reaction, which velocity is proportional to the nature and concentration of the medium and to the temperature. The more water in the reactive mass and the higher the temperature, the more rapid is the reaction, i. e., the evolution of carbon dioxid.

In my process, the ionic reaction is greatly retarded by a semi-solid consistency of system A and is entirely stopped in system B by making it dry and solid as hereinafter described. By varying the degrees of this consistency, the evolution of carbon dioxid can be regulated, if the temperature at which the operation is performed is taken into consideration. The desired consistency is attained by the proper use of one or of a mixture of the active principles to be incorporated in the product.

The above explanation will be more readily understood by referring to the following illustrative example:

Sodium carbonate containing hydrogen when mixed with tartaric acid in a dry state would not exolve carbon dioxid below 200–212° F., at least not very rapidly. This effervescent salt mixture, when mixed with a fruit syrup containing twenty per cent of water would evolve carbon dioxid slowly at a temperature of about 60–70° F. If this temperature be rapidly raised to about 100–212° F., the evolution of carbon dioxid will be very rapid. $NaHCO_3$ will be changed into $Na_2CO_3$ and some tartrate would be formed.

After allowing the reaction to go on for some minutes, a new system will be formed and the new system thus formed will be changed rapidly back to approximately the former system and at temperatures of about 60–70° F., the evolution of carbon dioxid would stop entirely. If this system be then dried by gradually increasing the temperature up to about 200° F., a hard mass would be formed that would not evolve carbon dioxid below 200° F., if protected from moisture. If this mass be then dissolved in water, it would rapidly form a solution with the evolution of carbon dioxid.

My process, therefore, deals with the intermediate steps between the first and the last steps as set forth above.

The theory of the preparation according to the principle of my process, of the products soluble in water with effervescence is set forth above. Practically the same reasoning can be advanced as to the theory of the preparation of the products soluble in water without effervescence. The only distinction is that in the non-effervescent products, no excess of the effervescent salts is used, but their quantity is calculated in such a way that the reaction is complete before the product is ready for the final drying.

Alkali metal carbonates containing hydrogen can be used without an acid, if the presence of an alkali metal carbonate in the final product is not objectionable.

An advantage of my process is that it produces a mass containing the active principles desired which is very porous and, therefore, if powdered and even if compressed into tablets in high powered machines, will form products which are readily soluble in water, providing of course, that all substances used are of such a nature as to be water soluble.

The difference between the products prepared in the ordinary way and the products prepared by my process or, the powders prepared by the precipitation or by grinding crystalline matter added to the porous powders prepared by my process, can be readily observed under the microscope. When two sets of powdered compressed tablets made by the same formula, but by the different processes referred to, were examined, the following observations were made: The powdered tablet that was made in the ordinary way showed compact masses of crystalline matter to which the active principle adhered or rather the crystals of the vehicle were seen to be cemented together by the active principle. In the powdered tablets prepared by my process, the texture was uniform and homogeneous, and compact crystalline masses cemented together by the active principle were not visible, so it appears that the principal difference between the old process of making tablets and my process is that, in the first, the active principle really forms the vehicle, while in the second process, the vehicle is formed solely by the interaction of the effervescent salts. In the tablets made by my process, the whole mass has under the microscope, the appearance of a homogeneous, porous, volcanic formation. It is interesting to note that this porosity is preserved, to a certain degree at least, even in compressed tablets, so that such porosity does not seem to be a mere mechanical state or condition of matter, but a fixed property of the mass like its solubility.

As to the practical applications of my process, I have discovered that by the treatment described below, all salts of carbonic acid and all salts of carbonic acid containing hydrogen and mixtures thereof, can be mixed intimately with all solid acids and their salts containing hydrogen or mixtures thereof, and used as a vehicle for making bodies and products such as tablets, pills, candies, confections, powders and other similar products which are indefinitely stable in dry atmosphere, but readily soluble in water. For this reason, I limit this process to the use of such normal or hydrogen containing salts of carbonic acid and to such solid acids or equivalent hydrogen containing salts thereof, which form water soluble salts as a result of their chemical interaction going on in ordinary way. For illustration, I give the following examples of materials adapted for use in the practice of my process: Sodium, potassium, ammonium, calcium, and magnesium carbonates with citric acid; all alkali metal carbonates and all alkali metal carbonates containing hydrogen with tartaric, lactic, gallic, pyrogallic, tannic, malic, oxalic acid, alums, alkali tartrates containing hydrogen and similar combinations. These mixtures for the sake of brevity and following the general custom in the art, I call effervescing salts.

These salts, as I have discovered, can form products readily soluble in water, with or without effervescence, when mixed according to my process with substances and preparations, either liquid or semi-liquid, containing water as set forth below, to the extent of between one to fifty per cent, combined or uncombined chemically to form the above named products.

The substances to be mixed with the effervescing salts can be, as I have found, of a widely varied nature such as syrups, different saccharine mixtures, and solutions like glucose and honey, water solutions of gums or colloidal preparations of gums and resins and other aqueous colloids, medicinal, fruit and flavoring extracts and fluid extracts, medicinal substances in a dry state or in concentrated, aqueous solutions, coloring matters, dyes, perfumes, substances used for cleaning and washing purposes, such as borates, phosphates, and soluble soaps, chemicals for photographic purposes and many other substances.

From this explanation, it will be apparent that my invention is of general application and is by no means limited to the particular substances and compounds enumerated above or those included in the general description of my process.

I have discovered that alkaline earth metal carbonates employed as a constituent of the effervescing salts form a quick drying mass which can be compounded by the use of much more water in the active principles than when alkali metal carbonates alone are used. Thus, a mass containing molecular quantities of calcium and magnesium carbonate with citric acid can be mixed with an extract containing nearly fifty per cent of water without an appreciable evolution of carbon dioxid at 60–70° F. Then, when by my treatment, a certain portion of carbon dioxid is evolved, the mass still containing over ninety per cent of available gas, i. e., gas capable of being evolved from the materials upon the addition of water, can be quickly dried at 200° F., and is at this temperature, perfectly dry in less than three hours. The product is a fine, white, porous, homogeneous powder adapted to be compressed into tablet form when desired, which effervesces slowly in water, and when kept dry, retains all the properties of the original extract used for mixing with the effervescent salts. Sugars require the use of a somewhat larger proportion of alkali metal carbonates and alkali metal carbonates containing hydrogen. Low melting substances, i. e., substances melting below 212° F., sometimes require the use of considerable quantities of alkaline earth metal carbonates. High melting substances, i. e., substances melting at above 212° F., sometimes require the addition of a small amount of ammonium carbonate, although this salt is to be used with great deal of care. The variable nature of the active principles which may be used require certain variations in the formula and composition as will be apparent to those skilled in the art from the foregoing explanation, but the general nature of the process remains absolutely the same.

In the use of some formulas, the temperature to which the mass is heated may range from 100–212° F., so that only the degree of temperature and the length of time of the initial heating and the degree of drying temperature and the length of time of drying are variable factors. This is of advantage in that the temperature and the length of time of heating and drying can be varied to suit not only the composition of the mass under treatment, but also the ordinary atmospheric temperature of the country in which the product is to be made or marketed.

Different sugars require also certain modifications of the composition, but, again, the general nature of the process remains the same. Maltose requires less alkali metal carbonates and more alkaline earth metal carbonates than honey or glucose and these again less than saccharose or raffinose. Acids and salts containing hydrogen must also be selected with a proper knowledge of their nature and of the nature of other ingredients, namely, of the nature of the active principles used.

In my process, as has been already mentioned, all acids and all carbonates are excluded which form salts insoluble in water. This, as it is evident, is to preserve the general solubility, more or less, of the products for the preparation of which my process is used. We have to take into consideration, however, the fact that certain salts or acids increase or decrease, as the case may be, the solubility of other salts, and that certain acids or their salts containing hydrogen are stronger than other acids or salts. The acids of phosphorus, for example, can be used only in certain cases, in other cases, they are too strong to expel a part only of the carbon dioxid. It is, however, very advantageous to use them for the products soluble without effervescence as the time of heating and drying is thereby greatly shortened.

The amount of water used in preparing semi-liquid solutions or rather suspensions of the active principles is governed by the nature of the salts resulting from the regular interaction of the effervescing salts. These and other factors are, of course, matters of common chemical knowledge, but they must be taken into consideration to insure a quick drying, permanently stable product readily soluble in water, with or without effervescence.

The practice of my process will be clearly apparent from the foregoing explanation and from the following illustrative example:

For the sake of brevity, sodium carbonate containing hydrogen will be considered to represent any normal or hydrogen containing salt of carbonic acid and citric acid to represent any solid acid and its salts containing hydrogen. The active principle will be represented by saccharose in solution in ordinary simple syrup containing about thirty per cent water.

I first mix the effervescent salts, previously finely powdered, in molecular proportions. To make this mixture more intimate, it may be first fused, dried, and then powdered, although this is not necessary. I then mix and preferably knead the powdered effervescent salts with the syrup to make a thick dough. For this I preferably take about one part of syrup to five parts of salts, although the quantity of syrups to be used is variable according to their nature, as will be readily understood. This mixing and subsequent kneading by hand or machine takes between ten minutes to one hour, depending upon how much water there is in the syrup. A longer time than ten minutes is necessary for syrups or extracts containing less than thirty per cent of water.

This operation is conducted at the lowest possible temperature, preferably about 60–70° F., although I can do it satisfactorily at a higher temperature, by using certain diluents as powdered sugar, lactose, corn sugar or the same product made previously by my process and well powdered, but this temperature is never over 100° F.

In the meantime, a drying oven is heated to 200° F., and the previously made dough is put into this oven and kept there for about five minutes. The evolution of carbon dioxid is very rapid and the mass becomes porous and dries quickly on its outer surfaces. The carbon dioxid evolved makes the mass porous and consequently more soluble.

The mass is then removed from the oven and cooled rapidly at a temperature of 60-70° F. At this stage, the mass forms a rather hard, porous, uniform mixture that could be powdered, but it would become sticky at the temperature slightly over 100° F.

By analysis, I have found that the mass contains at this stage, sugar, sodium carbonate, citric acid and sodium citrate containing one atom of hydrogen to the extent of five per cent of the total mass, so that the chemical reactions which took place here were:

$$2NaHCO_3 \rightarrow Na_2CO_3 + H_2O + CO_2$$

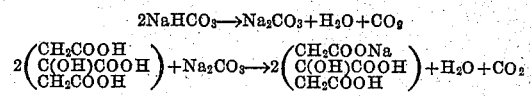

The amount of carbon dioxid evolved, as represented by this last reaction is very small. Ten per cent of the total carbon dioxid capable of being evolved from the mass under treatment is the average for nearly a hundred different mixtures I have so far studied in this respect.

By analysis, I have also found that the reason for the hardening of the mass on cooling is the removal of water which is taken up by sodium carbonate and the salt of citric acid in the example given above. In other cases, it is removed by other similar salts.

The particular mass produced in this example cannot at this stage, be used for making stable products which are hard and which will not evolve carbon dioxide slowly below and rapidly above 100° F. It must be further treated to make it stable so as not to evolve carbon dioxid in the neighborhood of 212° F., or more generally between 100 and 212° F.

For this reason, I do not allow this mass to become entirely solid at the temperatures below 100° F., but I mix it while it is still in a semi-solid state, with more of the diluent, referred to above, the total amount of which should be liberal, but it is better not to let it exceed a quantity equal in weight to that of the effervescent salts used. In the example under discussion, the ratio used was 1 to 1. The diluent is used to remove any water that for any reasons was left uncombined. By the use of the diluent, the mass may be brought to a desired consistency, so that it can be immediately used for making tablets lozenges, pills, candies, confections and similar products or it may be dried and powdered to be used in powdered form, as for example, for making compressed tablets. These products are then dried by gradually increasing the temperature preferably up to 212° F. This drying takes only a few hours and, in some cases, like that of the example given, the products are completely dry in three hours.

A particularly important advantage of this process is that all these products do not evolve even a trace of carbon dioxid at temperatures up to 212° F., and they keep their hardness indefinitely if protected from moisture, which protection may be effected in any known mechanical way. The products are very hard, stone-like, homogeneous, porous bodies, very stable in dry air but gradually decomposing with the evolution of carbon dioxid in a moist atmosphere, softening and thus gradually losing the power of effervescence and changing in composition. The dry bodies, however, dissolve quickly in water and in the particular example given, with effervescence.

Practically the same properties are observed in the products which dissolve in water without effervescence. In making such products, an excess of effervescent salts is avoided or care is taken to decompose all the effervescent salts present.

The following is an example of the practice of my process in the production of non-effervescent products:

Sodium carbonate containing hydrogen, citric acid, and sodium bromide, each finely powdered, are mixed to form a fine powder. The proportion of effervescent salts to the bromide is preferably 1 to 4. This ratio is not, of course, constant, but is given here to show that in such a ratio, the effervescent salts should not be in excess of the active principle. Five per cent by weight of effervescent salts to the total mass is commonly sufficient and fifty per cent by weight is the upper limit, although in such case, the process of heating to expel all carbon dioxid takes a very long time and in this example, it would take nearly two hours if the ratio were 1 to 1. I take, therefore, the powders mixed in the ratio of 1 to 4.

From the powdered mixture, I make a dough with simple sugar syrup that in this case is added in the ratio of 1 to 10 by weight to the total dry mass. This dough is preferably mixed at a temperature of 60-70° F., and at this temperature, generates practically no carbon dioxid. The dough is then placed in an oven previously heated to 100-212° F., and in the example, to preferably 200° F., and kept there till the dough stops rising or until carbon dioxid is no longer evolved. The length of time of this treatment is, therefore, proportional, if the temperature be constant, to the amount of the effervescent salts present. In this example, thirty minutes are sufficient to expel all carbon dioxid.

Then I take the mass that is soft and pliable at this stage, and by the use of a proper diluent, as hereinbefore set forth, I prepare a dough of such a consistency that it can be used for making products described above. The difference between these and the previously described products is only that these products are soluble in water without the evolution of carbon dioxid. They are also very stable in dry atmosphere, hard, porous, homogeneous, and can be kept indefinitely.

The advantage of treating such a mixture as that last described, according to my process, is that the carbon dioxid escaping during the process, makes the mass very porous, and such mass when dry, retains this property of the molecular porosity even on compression by high powered machines, and such bodies are therefore very soluble.

When the product prepared as described is dissolved in water, the solution contains a small quantity of sodium citrate, sugar, and sodium bromide, the medicinal properties of the bromide being in no way impaired and the bromide solution forms a sweet, pleasant drink.

It is to be understood that in the practice of my invention, solid salts of carbonic acid containing hydrogen are the equivalents of solid normal carbonates and that solid salts of acids containing hydrogen are the equivalents of solid acids. It is also to be understood that the term "effervescing salts" as here employed contemplates any mixture of a solid normal or hydrogen containing carbonate with any solid acid or solid salt of such acid, containing hydrogen, which upon addition of water, react to produce salts soluble in water and that the term "liquid active principle" contemplates extracts, suspensions and emulsions of such active principle in either freely liquid or semi-liquid form.

While I have described in detail the principle of my process and by way of illustrative examples, the best methods known to me of putting the same into practice, it is to be understood that the materials used, their proportions, and the details of procedure may be widely varied and that known equivalents of the materials above referred to may be used, all without departure from the spirit of my invention or the scope of the subjoined claims.

Having thus described my invention, I claim:

1. The herein described water soluble product consisting of a hard, dry, porous mass which is stable in the absence of moisture, comprising an active principle and a vehicle consisting of effervescing salts which have reacted together to produce a limited amount of carbon dioxid but which are capable of further reaction to produce additional carbon dioxid.

2. The herein described water soluble product consisting of a hard, dry, homogeneous, porous mass which is stable in the absence of moisture, comprising an active principle and a vehicle consisting of effervescing salts, said mass as seen under the microscope being free from crystals of said vehicle having particles of the active principle adhering thereto.

3. The herein described process of producing a hard, dry, porous, water soluble product which is stable in the absence of moisture which consists in mixing an active principle with a vehicle comprising powdered effervescing salts, causing the effervescing salts to react to evolve a limited amount of carbon dioxid, and stopping the reaction before it is complete.

4. The herein described process of producing a hard, dry, porous, water soluble product which is stable in the absence of moisture which consists in mixing a liquid active principle with a vehicle comprising effervescing salts in proportions to form a plastic mass, forming a plastic mass therefrom, causing the effervescing salts to react to evolve a limited amount of carbon dioxid, stopping the reaction before it is complete, and drying the resulting mass.

5. The herein described process of producing a hard, dry, porous, water soluble product which is stable in the absence of moisture which consists in mixing a liquid active principle with a vehicle comprising effervescing salts in proportions to form a plastic mass, forming a plastic mass therefrom, heating such mass to cause the effervescing salts to react to produce carbon dioxid, and then cooling and drying the resulting mass.

6. The herein described process of producing a hard, dry, porous, water soluble product which is stable in the absence of moisture which consists in mixing a liquid active principle with a vehicle comprising effervescing salts in proportions to form a plastic mass, forming a plastic mass therefrom, heating the mass to 100° to 212° F. to cause the effervescing salts to react to produce carbon dioxid, cooling the mass to check the evolution of carbon dioxid when the reaction has resulted in the evolution of less carbon dioxid than the effervescing salts are capable of producing by their complete reaction, and drying the mass.

7. The herein described process of producing a hard, dry, porous, water soluble product which is stable in the absence of moisture which consists in mixing a liquid active principle with a vehicle comprising effervescing salts in proportions to form a plastic mass, forming a plastic mass therefrom, heating the mass to 100° to 212° F. to cause the effervescing salts to react to produce carbon dioxid, cooling the mass to check the evolution of carbon dioxid when the reaction has resulted in the evolution of less carbon dioxid than the effervescing salts are capable of producing by their complete reaction, adding a solid diluent adapted to absorb water, and drying the resulting mass.

8. The herein described process of producing a hard, dry, porous, water soluble product which is stable in the absence of moisture which consists in mixing a liquid active principle with a vehicle comprising effervescing salts in proportions to form a plastic mass, forming a plastic mass therefrom, heating the mass to 100° to 212° F. to cause the effervescing salts to react to produce carbon dioxid, cooling the mass to check the evolution of carbon dioxid when the reaction has resulted in the evolution of about 10 per cent of the carbon dioxid which the effervescing salts are capable of producing by their complete reaction, and drying the resulting mass.

9. The herein described process of producing a hard, dry, porous, water soluble product which is stable in the absence of moisture which consists in mixing a liquid active principle with a vehicle comprising effervescing salts in proportions to form a plastic mass, forming a plastic mass therefrom, heating the mass to 100° to 212° F. to cause the effervescing salts to react to produce carbon dioxid, cooling the mass to check the evolution of carbon dioxid when the reaction has resulted in the evolution of about 10 per cent of the carbon dioxid which the effervescing salts are capable of producing by their complete reaction, adding a solid diluent adapted to absorb water, and drying the resulting mass.

In testimony whereof, I affix my signature in presence of two witnesses.

JOSEPH PELC.

Witnesses:
 RUDOLPH TABORSKY,
 PORNES HRDLICKA.